(No Model.)
W. F. SINGER.
APPARATUS FOR MANUFACTURING ICE.
No. 571,141. Patented Nov. 10, 1896.
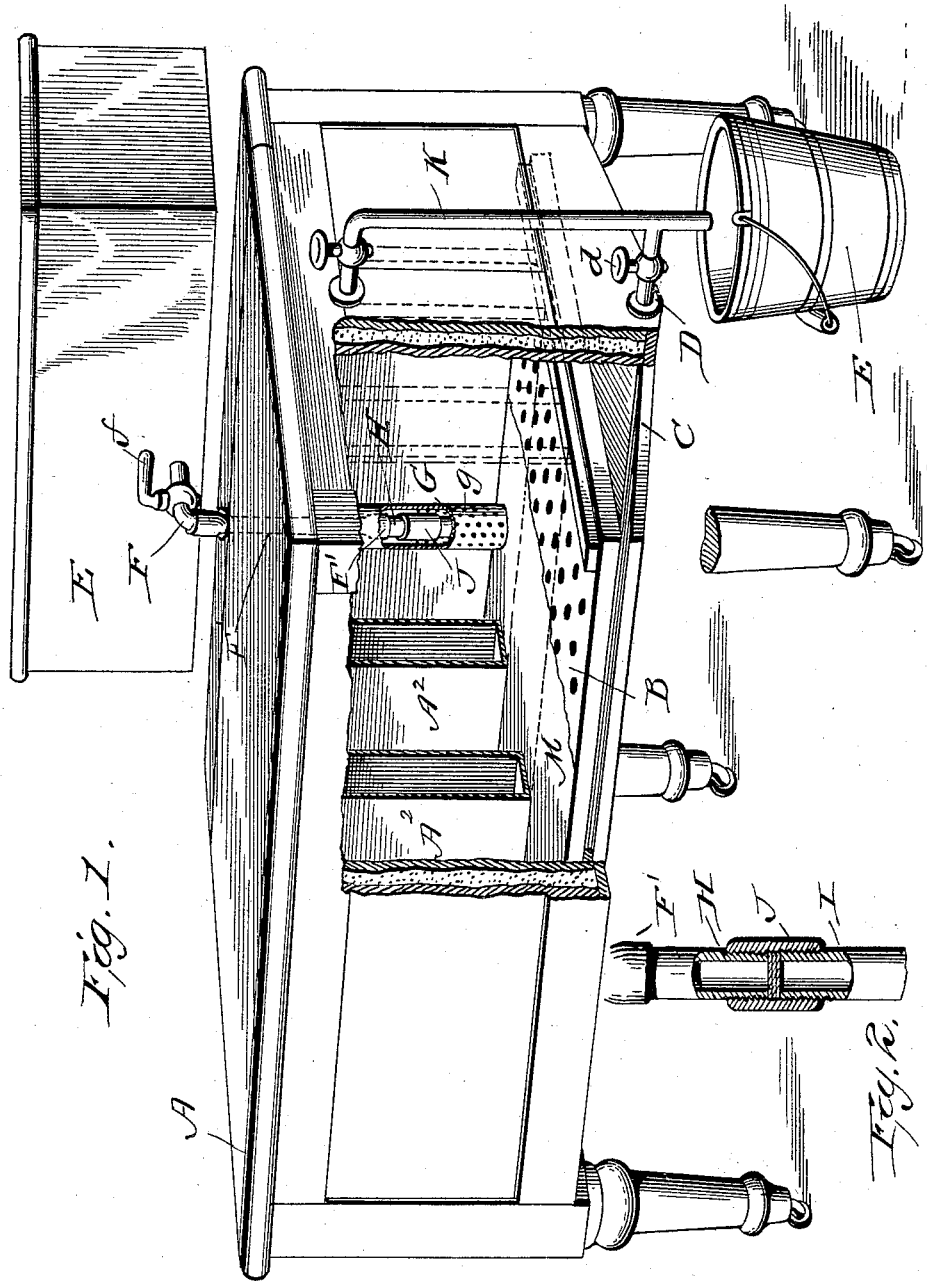

UNITED STATES PATENT OFFICE.

WILLIAM F. SINGER, OF NASHVILLE, TENNESSEE, ASSIGNOR TO THE HOME ICE MAKER COMPANY, OF SAME PLACE.

APPARATUS FOR MANUFACTURING ICE.

SPECIFICATION forming part of Letters Patent No. 571,141, dated November 10, 1896.

Application filed February 16, 1895. Renewed March 30, 1896. Serial No. 585,498. (No model.)

*To all whom it may concern:*

Be it known that I, WILLIAM F. SINGER, a citizen of the United States, residing at Nashville, in the county of Davidson and State of Tennessee, have invented certain new and useful Improvements in Processes of Manufacturing Ice; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in the art of artificially producing ice in cakes or blocks for family or individual use.

The invention has for its object, among others, first, the provision of suitable apparatus whereby cakes or blocks of ice may be produced within a few hours' time without the necessity of replenishing the refrigerating material after the apparatus has been once charged.

The invention has for a further object the provision of apparatus for supplying water to the refrigerating material automatically and in such quantities as to insure the maintenance throughout the mass of refrigerating material of the required degree of moisture necessary to produce a sufficiently low degree of temperature for as many hours as may be found to be necessary to produce perfect freezing of the ice cakes or blocks.

A further object of the invention consists in the construction of the apparatus employed for supplying water to the refrigerating material in such a manner as to insure an even and uniform distribution of the water throughout the mass without the necessity of agitation or any further care or manipulation upon the part of the attendant.

While the apparatus which will be hereinafter described is adapted for manufacturing ice upon a larger scale, and I contemplate such use, still the apparatus which I have illustrated is such as would ordinarily be used in making smaller-sized cakes of ice suitable for family use.

The invention is clearly illustrated in the accompanying drawings, which, with the letters of reference marked thereon, form a part of this specification, and in which—

Figure 1 is a perspective view of the apparatus which I employ in carrying out my invention, parts being shown as broken away for the purpose of more clearly illustrating the details. Fig. 2 is an enlarged detail in perspective and partly in section of the filter employed in automatically regulating the water supply to the chemicals employed as refrigerants.

Reference now being had to the details of the drawings by letter, A designates a suitable freezing-chamber, which may be of any desired size or general form, being provided with the usual double walls and having a perforated false floor B, beneath which is provided a bottom C, said bottom being in the form of a trough which extends the entire length of the freezing-chamber and is slightly lower at one of its ends than at the other in order to allow the water which passes through the perforations in the false floor B to flow to the discharge-pipe D, through which, upon the opening of the valve $d$, it passes to a pail or other receptacle E, provided for the purpose of catching the waste water.

Within the chamber A are placed suitable removable ice-molds $A^2$, which are preferably made of copper and are lined with tin. In the present instance I have shown the chamber as provided with two of these molds, though it is of course evident that the number may be increased, or a single mold may be used if preferred. The spaces between the molds and also between the molds and the side walls of the freezing-chamber are preferably equal.

Water is supplied to the freezing-chamber from any suitable source of supply, as, for instance, from a tank E, by an inlet-pipe F, having a stop-valve $f$, attached to which pipe is the rubber tube F', which enters the top of the freezing-chamber, preferably at substantially the longitudinal center of the rear side of the chamber, as shown. Surrounding the tube F', within the chamber A, is a cylinder G, secured to the under side of the top of the chamber, and the lower end of which extends to a point near the false bottom B of the chamber, and the lower half of the said cylinder is perforated, as shown at *g*, while the upper portion of the cylinder is imperforate. The portion of the tube F' within the chamber A is flexible, being preferably made of rubber. The lower end of the pipe is provided with a metal tube H, which is connected to the upper end of a pipe or tube I by means of an ordinary collar or pipe-coupling J, and between the connecting ends of the said pipes H and I are placed small pieces of blotting-paper, the number of thicknesses of paper used depending upon the amount of water which may be required to pass through the filter within a given time, thus rendering it possible, by changing the number of thicknesses of blotting-paper, to regulate the inflow of water as may be required. This change is made possible and easy by reason of the flexibility of the pipe F' and the coupling J, which may be readily removed to allow the placing of the sheets of blotting-paper in position. By detaching the pipe F' that and the parts H and J, connected therewith, can be withdrawn and the number of sheets of blotting-paper increased or diminished.

A suitable overflow-pipe K is provided, whereby the water is prevented at any time from rising above a certain predetermined level within the freezing-chamber.

In producing ice blocks or cakes in accordance with my process the molds $A^2$ are filled with water and placed within the freezing-chamber. The chemicals which are to be employed as refrigerants are packed around the said molds. The water supply having been properly gaged by the insertion of the required number of thicknesses of blotting-paper in the inlet-pipe, as described, the valve *f* is closed and a sufficient amount of water is poured into the chamber to fill said freezing-chamber to a point about one-half of its depth. This large quantity of water is admitted for the purpose of producing a rapid cooling of the freezing-chamber and its surroundings, as at the time the chemicals are first placed in the chamber the molds, the water contained therein, and the entire interior of the chamber are at a temperature far above the freezing-point, and it is desirable that the temperature should be reduced as quickly as possible to the freezing-point, after which a low degree of temperature is uniformly maintained by a less expenditure of chemicals, and hence a limited supply of water, sufficient only to maintain a gradual solution of the chemicals, is required. The water is allowed to stand in the chamber for about one hour, when it is drawn off and the stop-cock *f* is opened and the water is allowed to enter gradually through the filter G, the valve *d* in the outlet-pipe having been previously closed.

By the arrangement described it will be observed that the water is admitted gradually as the same is required to produce a uniform solution of the chemicals within the freezing-chamber, and as it is admitted at a point near the bottom of the chamber its uniform and free distribution throughout the mass of chemicals in the chamber is insured without the possibility of the water freezing, as would be the case if it were admitted at the top of the chamber. A uniform low temperature is thus maintained throughout all parts of the chamber without the necessity of agitating the chemicals or of any attention whatever upon the part of the attendant, the apparatus requiring no care or attention whatever after the opening of the valve in the inlet-pipe until the cakes or blocks of ice have been frozen.

In order to prevent the possibility of escape of the chemicals through the perforations in the false bottom B, I employ a covering of cloth or other porous material M over the said bottom, as shown.

It is well known that the specific gravity of fresh water is much less than water after it has taken up or has been impregnated with any salt. Hence the necessity of introducing the water below the surface of the chemicals in the refrigerating-chamber, in order to prevent freezing of the water above the surface of the chemicals, which would destroy the object of introducing fresh water.

As a result of my experiments in the manufacture of ice by the solution of solid substances I have found that a larger amount of work is required to be performed by the solution of the chemicals used as refrigerants during the first hour, owing to the fact that all of the heat contained in the freezing-chamber and the molds containing the water to be frozen must be quickly removed. Hence, as stated in the foregoing description, a large amount of water is employed in the early stage of the freezing process. I have also found that after the temperature of the freezing-chamber and molds has been reduced below 32° the temperature may be very economically maintained with a less expenditure of chemicals by furnishing uniformly a supply of water which is just sufficient to insure a sufficient solution of the chemicals to maintain a temperature below the freezing-point for as long a time as chemicals remain within the freezing-chamber, the length of time being controlled by the quantity of material placed in the freezing-chamber.

Having thus described my invention, what I claim to be new, and desire to secure by Letters Patent, is—

1. The combination with a freezing-chamber with perforated false bottom, of molds in said chamber, a pipe and a cylinder extending into said chamber for supplying water to the refrigerant, said cylinder having a perforated portion substantially as described.

2. The combination of a freezing-chamber with perforated false bottom, of molds in said chamber, a pipe and a cylinder extending into said chamber for supplying water to the refrigerant, said cylinder having a perforated portion and sheets of percolating material in said pipe, substantially as described.

3. The combination of a freezing-chamber with perforated false bottom, of molds in said chamber, a pipe and a cylinder extending into said chamber for supplying water to the refrigerant, said cylinder having a perforated portion, sheets of percolating material in said pipe and a screw-coupling so arranged as to permit of varying the number of said sheets, substantially as specified.

4. The combination with the freezing-chamber, of the tank and its pipe, the cylinder extending into the chamber for supplying water to the refrigerant and having perforations near its lower end, a flexible portion to said pipe, a detachable pipe and coupling, and sheets of blotting-paper or similar material held thereby, substantially as described.

In testimony whereof I affix my signature in presence of two witnesses.

WILLIAM F. SINGER.

Witnesses:
FRANKLIN H. HOUGH,
A. L. HOUGH.